United States Patent [19]

Ten Pas

[11] Patent Number: 4,562,662

[45] Date of Patent: Jan. 7, 1986

[54] TREE SUPPORT DEVICE

[76] Inventor: Carl E. Ten Pas, 330 E. Union Ave., Cedar Grove, Wis. 53013

[21] Appl. No.: 661,706

[22] Filed: Oct. 17, 1984

[51] Int. Cl.[4] .......................................... A01G 17/12
[52] U.S. Cl. ........................................................ 47/43
[58] Field of Search ..................................... 47/42, 43

[56] References Cited

U.S. PATENT DOCUMENTS

| 1,214,142 | 1/1917 | Dingwall | 47/43 |
| 2,501,255 | 3/1950 | Bell | 47/43 |
| 3,526,056 | 9/1970 | Stropkay | 47/42 |

Primary Examiner—Robert Bagwill
Attorney, Agent, or Firm—Fred Philpitt

[57] ABSTRACT

A tree support system having trunk-engaging collars, ground-engaging legs, and elastic straps connecting the collars with the trunks at a lower level.

5 Claims, 2 Drawing Figures

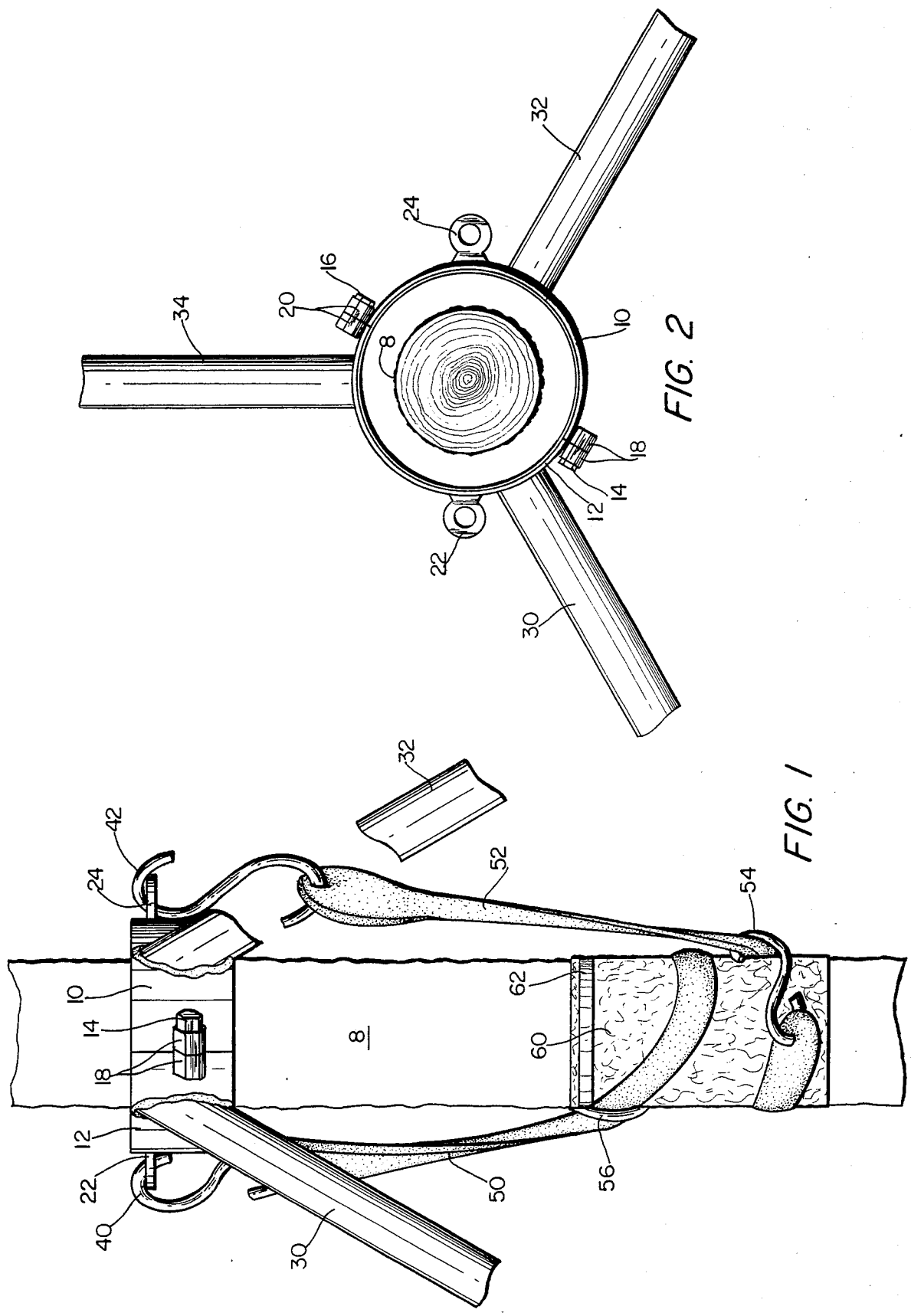

TREE SUPPORT DEVICE

The present invention pertains to a device for supporting trunks of young trees in an essentially vertical position. It includes a tripod supported collar surrounding the tree trunk at a spaced distance therefrom and at least two flexible straps depending from said collar which grip and support a portion of the trunk located beneath the collar.

Prior art workers have devised a number of different devices for supporting young trees in an upright position. Example of some patents in this field are U.S. Pat. Nos. 1,214,142; 2,501,255 and 3,526,056. Each of these devices suffers from certain limitations.

Considered from one aspect, the present invention broadly pertains to a tree support device that includes in combination (a) a pair of arcuate semicircular collar members that are sized to surround the trunk of a tree at a spaced distance away from the outer circumference of the tree, (b) means for fastening said pair of collar members together into a substantially vertical cylinder having a longitudinal axis closely approximating the axis of the tree it surrounds, (c) at least one leg member extending downwardly and outwardly from each collar member, the total number of leg members being at least three, (d) a pair of longitudinally extensible strap members extending downwardly from opposite sides of said vertical cylinder, (e) fastening means for fastening the upper end of each strap member to said vertical cylinder, and (f) connector means for connecting the lower end of each strap member to a point on the strap member which is above the lower end of the strap member to thereby form a loop in the lower end of the strap member, which loop is of a size to tightly surround the trunk of the tree that the support device is to be used with.

The invention can be better understood by reference to the drawings wherein:

FIG. 1 is a fragmentary side view of one embodiment of my invention; and

FIG. 2 is a fragmentary plan view of the collar and legs of the embodiment shown in FIG. 1.

Referring now to the drawings, it is seen that a pair of arcuate semicircular collar members 10 and 12 surround the trunk of a tree 8 so as to leave a substantial free space between them and the exterior circumference of the tree 8. The ends of the collar members 10 and 12 are provided with outwardly extending flanges 18 and 20 that are adapted to receive fastening bolts 14 and 16. When the semicircular collars 10 and 12 are joined together by bolts 14 and 16 a substantially vertical cylinder 10-12 is provided having a longitudinal axis closely approximating the axis of the tree trunk 8 when the tree is centered in said cylinder. The collar members are preferably made of metal, although a strong plastic might suffice for certain purposes. The interior of each of the collar members 10 and 12 is preferably covered with a material analogous to carpet so as to minimize the chances of damage should the exterior of the tree be tilted or scraped against the interior of the cylinder 10-12.

Leg members 30, 32, 34 are joined (e.g. by welding) to the exterior of the vertical cylinder 10-12 and said leg members extend outwardly and downwardly. In the embodiment shown one leg member is joined to collar member 10 and two legs are joined to collar member 12 so that a tripod structure results. It might be possible to have additional legs under special circumstances or to have the leg members of different lengths. The upper ends of the leg members could also be bolted to the collar members 10 and 12 so as to permit variation of the downward angle of the leg members.

A pair of strap members 50, 52 extend downwardly from opposite sides of the vertical cylinder 10-12. These strap members are preferably rubber tarp straps or bungees that can be stretched longitudinally to a limited extent. The cross section of the straps is preferably rectangular, but they may also be circular or oblong. A suitable length for the strap members is 8-18 inches, preferably about 10 inches, but the optimum length will depend upon the diameter of the tree, its flexibility, etc.

The upper ends of the strap members are fastened to cylinder 10-12 in any suitable manner. In the embodiment shown this fastening means comprises washers 22 and 24 welded to the outside of collar members 12 and 10, and S-shaped hooks that connect holes in the upper ends of the strap members with openings in the washers 22, 24.

The lower ends of the strap members are associated with connector means for connecting the lower end of each strap member to a portion of the strap member which is above the lower end of the strap member to thereby form a loop in the lower end of each strap member, the size of the loop being a size which will tightly surround the trunk of a tree. In the embodiment shown the connector means is an S-shaped hook (54 or 56) having one section which engages a hole in the lower end of the strap member and another section which fits around a higher portion of the strap. (The other section of the S-shaped hook could just as well engage another higher hole in the strap.) When the two straps are used it is preferred that the loops be disposed in opposite directions (e.g. one clockwise and one counterclockwise) to minimize possible uneven twisting forces.

Since some tree trunks might be adversely affected by the frictional forces sometimes generated by the looped lower ends of the strap members, a preferred embodiment of my invention includes a cylinder of some thick pliable material 60 (such as carpeting) immediately inwardly of the two lower strap loops. This cylinder of material 60 is fitted tightly around the tree and fixed at the desired point on the tree by tape 62 or other suitable means.

The tree support device is preferably put into position by joining the two collar members 10 and 12 together around a tree trunk by means of bolts 14 and 16. A cylinder of thick carpeting material is then fixed around the tree trunk by means of tape 62 at a point below the collar members 10 and 12. The straps 50 and 52 are then connected as shown, and these straps are preferably maintained under tension. The trunk is thereby centered in the cylinder 10-12 and maintained in an upright position.

A great advantage of the tree support device of this invention is that when the lawn surrounding a tree has to be mowed, the tripod structure can be lifted upwardly against the tensioning force of the straps and rotated enough so that the mower can then be run over the grass areas previously covered by the base of the legs. This essentially eliminates the need for hand trimming around the base of the legs, which represents a considerable saving of time and labor in orchards, parks, cemetaries and the like. It is believed that the present tree support structure is the only one which permits such quick and easy movement of the legs.

What is claimed is:

1. A tree support device comprising in combination
   (a) a pair of arcuate semicircular collar members that are sized to surround the trunk of a tree at a spaced distance away from the outer circumference of the tree,
   (b) means for fastening said pair of collar members together into a substantially vertical cylinder having a longitudinal axis closely approximating the axis of the tree it surrounds,
   (c) at least one leg member extending downwardly and outwardly from each collar member, the total number of leg members being at least three,
   (d) a pair of elastic strap members extending downwardly from opposite sides of said vertical cylinder,
   (e) fastening means for fastening the upper end of each strap member to said vertical cylinder, and
   (f) connector means for connecting the lower end of each strap member to a point on the strap member which is above the lower end of the strap member to thereby form a loop in the lower end of the strap member, which loop is of a size to tightly surround the trunk of the tree that the support device is to be used with.

2. A tree support device according to claim 1 which additionally includes a cylinder of thick pliable material immediately inwardly of the loops set forth in (f).

3. A tree support according to claim 1 wherein said strap members are made of rubber.

4. A tree support according to claim 1 wherein the interior of said vertical cylinder set forth in (b) is covered with a carpet-like material.

5. A tree support according to claim 1 wherein said fastening means of (e) and said connector means of (f) include S-shaped hooks.

* * * * *